Feb. 16, 1971  D. F. STACKHOUSE ET AL  3,563,850
ELECTRICAL INSULATION CONTAINING EPOXY RESIN,
BIS(2,3-EPOXY-CYCLOPENTYL) ETHER AND
RESORCINOL FORMALDEHYDE RESIN
Filed June 11, 1969

Inventors
Donald F. Stackhouse,
Mark Markovitz, by Howard D. Schlencher
Their Attorney.

United States Patent Office 3,563,850
Patented Feb. 16, 1971

3,563,850
ELECTRICAL INSULATION CONTAINING EPOXY RESIN, BIS(2,3-EPOXY-CYCLOPENTYL) ETHER AND RESORCINOL FORMALDEHYDE RESIN
Donald F. Stackhouse and Mark Markovitz, Schenectady, N.Y., assignors to General Electric Company, a corporation of New York
Continuation-in-part of application Ser. No. 603,247, Dec. 20, 1966. This application June 11, 1969, Ser. No. 834,224
Int. Cl. C08g *45/08*
U.S. Cl. 161—184          10 Claims

ABSTRACT OF THE DISCLOSURE

Electrical insulation treated with solventless resin compositions comprising (a) relatively slower curing bis(2,3-epoxycyclopentyl) ether, (b) other relatively faster curing 1,2 epoxy resin, and (c) resorcinol formaldehyde hardener is characterized by ready application and good electrical and physical properties.

---

Figure 1:
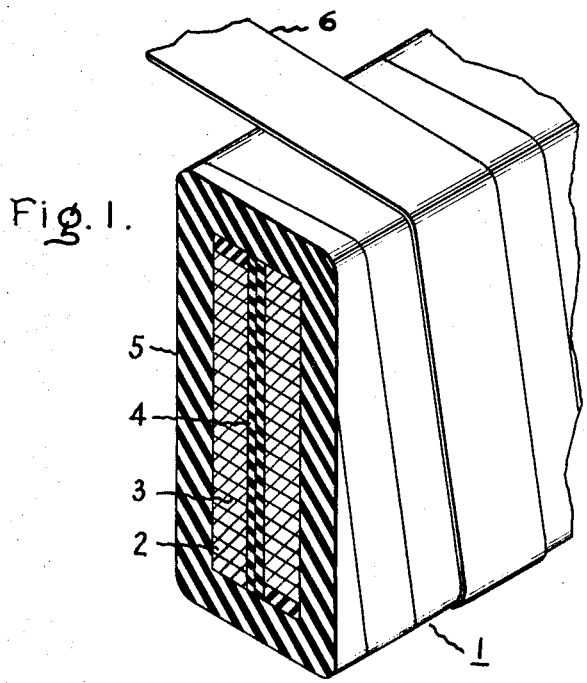

This application is a continuation-in-part of application Ser. No. 603,247, filed Dec. 20, 1966, and assigned to the same assignee as the present application.

This invention relates to electrical insulation. More particularly, it relates to insulation such as that comprising a micaceous material treated with solventless resin compositions comprising (a) bis(2,3-epoxycyclopentyl) ether, (b) other 1,2 epoxy resin, and (c) resorcinol formaldehyde resin condensate hardener or curing agent and to uses of such materials.

The use of resin-impregnated micaceous materials such as mica flake, mica paper and the like in the form of sheets or tapes for insulating electrical conductors, electrical machine windings and electrical assemblies is well known. There are described, for example, in U.S. Pat. 2,707,204, patented Apr. 26, 1955, and assigned to the same assignee as this invention, micaceous tapes impregnated with particular polyester and epoxy resin compositions. Such materials are well suited for insulation of electrical components. However, such materials along with many others proposed in the prior art require solvents for efficient resin impregnation of the micaceous material, such solvents being necessarily removed before the curing of the resin component. The vacuum treating equipment necessary for such solvent removal as well as the time and care involved represents a substantial investment. Even more important is the fact that during operation, the insulation tends to puff providing ready sites for electrical breakdown if all solvent is not removed.

It has been a primary goal of those concerned with electrical insulation of the present type to achieve solventless resin systems which provide readily cured tapes or sheets of micaceous material so that the time consuming removal of solvent with its attendant detraction from the insulating qualities of the material can be obviated. Among the materials which have been considered for such solventless impregnating resins are the so-called epoxy, ethoxyline or epoxide resins, such materials being well known in the art. However, it has been found that epoxy resins hardened by acid anhydrides such as, for example, methylbicyclo(2,2,1)heptene-2,3-dicarboxylic anhydride isomer known as Nadic methyl anhydride, while easily cured at elevated temperatures, have relatively low heat distortion temperatures in the 140–160° C. range and the shelf life of such materials at room temperature is generally of the order of one week. While epoxy resins cured by boron trifluoride-amine complexes such as $BF_3$·methyl ethyl amine complex have a desirably long shelf life and heat distortion temperatures which are high especially in the case of epoxylated novolacs, the dissipation factors of such materials at elevated temperatures of the order of 150° C. leaves much to be desired. Curing of such materials being highly exothermic often becomes uncontrollable. The fast gel formation and high exotherm also make it difficult to prepare the void-free laminate type structures which are highly desirable in electrical insulating applications. While bisphenol-A [2,2-bis-(4-hydroxyphenyl)propane] base epoxy resins having phenol formaldehyde resin hardeners are characterized by good shelf life and controllable cures at elevated temperatures, their mechanical properties begin to deteriorate at temperatures above 100° C. at which such insulation must operate. Attempts to use other base resins such as the polyesters in such solventless impregnating compositions have also been unsatisfactory.

From the above it will be quite apparent that there is a definite need for electrical insulating systems comprising micaceous materials treated or coated and impregnated with solventless resins which have an easily controlled void-free cure and which are possessed of desirably high temperature electrical insulating properties. It is a primary purpose of this invention to provide such insulation and electrical components insulated therewith.

Briefly, the invention relates to micaceous materials treated with a mixture of ingredients comprising (a) bis(2,3-epoxycyclopentyl) ether, (b) other 1,2 epoxy resin, and (c) hardener comprising resorcinol formaldehyde condensate. It has been found that such compositions are possessed of a desirably long shelf life at room temperature of over six months. The resulting insulation has good mechanical properties at room temperature and elevated temperatures up to 200° C. as well as a high heat distortion temperature. Such materials can also be cured at elevated temperatures without the formation of undesirable voids and imperfections. Since these materials are solventless, the only vacuum treatment necessary in curing built-up laminates of such insulation is that which is necessary to remove air. As more fully described hereinafter, a properly balanced composition of such materials provides micaceous based tapes and sheets having a suitable drape or hand for application to electrical components by manual or machine methods.

Bis(2,3-epoxycyclopentyl) ethers are well known and are manufactured, for example, by Union Carbide Corporation as ERRA 0300 which has an epoxide equivalent weight of 91 to 97 and ERLA 0400 having an epoxide equivalent weight of 91 to 97. The ERRA 0300 and ERLA 0400 stereoisomer materials can be expressed respectively by Formulas I and II below:

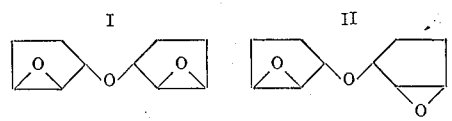

Added to the above materials are any of a number of other 1,2-epoxy resins. Thus, the above basic bis(2,3-epoxycyclopentyl) ethers can be augmented with other related epoxide materials such as CY 175 manufactured by Ciba having an epoxide weight of 160, UNOX 206 manufactured by Union Carbide having an epoxide equivalent of 74 to 78, ERLA 4221 manufactured by Union Carbide having an epoxide equivalent weight of 126 to 140 and UNOX 201 manufactured by Union Carbide having an epoxide equivalent weight of 145 to 156. These materials are represented respectively by formulations III through VI below:

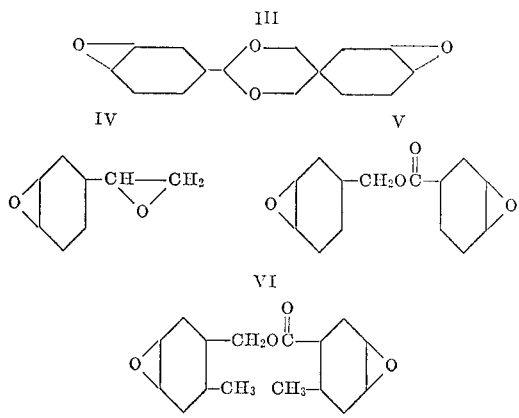

The bis(2,3-epoxycyclopentyl) ether can also have added thereto epoxy novolac resin, preferably having epoxide equivalent weights of about 175 to 182 and a functionality of from about 3 to 4. These are represented by Formula VII where $n$ is equal to from about 1 to 2. A typical material of this type is epoxy novolac resin ERLA 0449 manufactured by Union Carbide or Dow Chemical's epoxy novolac resin DEN 438.

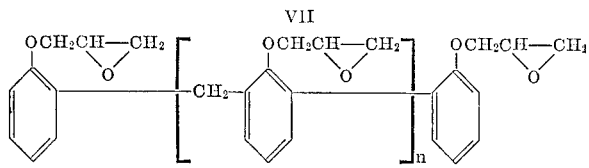

Other 1,2 epoxy materials which can be used include the bisphenol-A diglycidyl ether epoxy resins, epoxidized polyolefins and epoxidized oils, all of which are well known in the art. The addition of other 1,2 epoxy resins is desirable for modifying the viscosity, tack, and speed of cure of these compositions.

Generally speaking, any resorcinol formaldehyde resin which will dissolve in the system and not formed using a catalyst containing a basic material is suitable. Such resorcinol formaldehyde compositions having a catalyst with a basic component result in too rapid cure of the final resin system. For example, when the composition of Example 5 below was cured with a resorcinol formaldehyde resin containing 7200 parts per million (p.p.m.) of sodium, the gel time of the resin system at 160° C. was an unsuitably short 1½ minutes. However, when an essentially sodium or alkali metal-free (11 p.p.m.) resorcinol formaldehyde resin was used as in Example 5, the gel time was a desirably longer 26 minutes. In general, the catalyst used in the preparation of the resorcinol formaldehyde resin should be acidic or neutral in nature.

Among the resorcinol formaldehyde resins useful in the present connection are Kopper's Penacolite B–1A and Catalin's CR–784. The above Penacolite resin has a softening point of 103° C. to 112° C. using ASTM ring and ball method E–28. It has a pH in 50 percent by weight water solution of from about 1.2 to 1.7 and a maximum moisture content of about 1.0 percent.

The resinous materials of the present invention which have been found to provide the best balance in a finished tape or sheet of micaceous material with respect to good electrical and mechanical properties, ease of application, good shelf life and proper drape or hand for ready application to electrical components consist generally of by weight from about 30 to 70 percent bis(2,3-epoxycyclopentyl) ether and about 70 to 30 percent of other 1,2 epoxy resin. It has been found, for example, that insulation made using all epoxy novolac resin is too brittle for proper taping. Bisphenol-A diglycidyl ethers would also be lacking in certain properties as would various other 1,2 epoxides. On the other hand, insulation consisting solely of bis(2,3-epoxycyclopentyl) ether as the resin components are too slippery for easy application. Preferably, the amount of resorcinol formaldehyde resin used is that which provides from about 0.6 to 1.2 hydroxyl groups per epoxy group. Where low weight loss is of primary concern, such a stoichiometric ratio of about 0.7 is preferred. The most preferred stoichiometric ratio considering all properties is about 0.84 but materials within the above range will provide final insulating materials which are suitable for most purposes. In general, the adjustment of this stoichiometric ratio involves a balance between better electrical and mechanical properties at the higher ratios and lower weight loss on thermal aging at the lower ratios.

An important feature of the present invention is the fact that the bis(2,3-epoxycyclopentyl) ethers cure more slowly than the other 1,2 epoxy resins. The present precisely balanced and critical combination of materials imparts longer shelf life to the compositions and the ability to carry out hot melt solventless impregnation as at from about 70° C. to 90° C. or other elevated temperatures of micaceous and other materials without danger of gelation. The material so impregnated is further possessed of good mechanical properties such as handleability, hand, drape, and the like which permit ready application of electrical conductors, conductor bars and other base structures. The final cured material is furthermore possessed of a higher heat distortion temperature than ordinary 1,2 epoxy resin compositions and is also characterized by good electrical properties.

Shown in Table A below are the gel times at 160° C. of various epoxy resins cured with an oxalic acid catalyzed resorcinol formaldehyde resin (B–1A). ERL 4205 is a bis(2,3-epoxycyclopentyl) ether, being a mixture of ERRA 0300 and ERLA 0400 and having a functionality of about 2.0, Epon 828 is a bisphenol-A-diglycidal ether epoxy resin having a functionality of about 2.0, DEN 431 is an epoxy novolac resin having a functionality of 2.2, and DEN 438 is an epoxy novolac resin having a functionality of about 3.6. The gel times at 160° were determined for resins containing 1.0 equivalent of epoxy resin per 0.85 equivalent of resorcinol formaldehyde resin. All parts are by weight (p.b.w.).

TABLE A

| | Gel time at 160° C., p.b.w. |
|---|---|
| ERL 4205 | 94 |
| Epon 828 | 188 |
| DEN 431 | 176 |
| DEN 438 | 179 |
| B1A | 51.8  51.8  51.8  51.8 |
| Gel time at 160° C. (minutes) | 135–150  105  73–78  60 |

It will be apparent from a consideration of Table A that the gel time of the epoxycyclopentyl ether-resorcinol formaldehyde combination is unexpectedly much longer than that of the glycidal ether epoxy resin- and epoxy novolac resin-resorcinol formaldehyde combinations.

The heat distortion temperatures of various compositions of the resins of Table A above were determined, all samples being cured for 15 hours at 160° C., the heat distortion temperature being measured at 264 p.s.i.

Show in Table B below are the results of such heat distortion tests, the numbers in parenthesis showing the equivalents of epoxy and resorcinol formaldehyde material. Generally speaking, the higher the functionality of a material, the higher the heat distortion temperature.

Numbers in parenthesis refer to equivalents of epoxy resin and resorcinol formaldehyde.

TABLE B.—HEAT DISTORTION TEMPERATURE (HDT)

| | | | | | | | | |
|---|---|---|---|---|---|---|---|---|
| ERL 4205 | 94 (1.0) | 94 (1.0) | | | | | | |
| Epon 828 | | | 188 (1.0) | 188 (1.0) | | | | |
| DEN 431 | | | | | 176 (1.0) | 176 (1.0) | | |
| DEN 438 | | | | | | | 179 (1.0) | 179 (1.0) |
| B1A | 61 (1.0) | 51.8 (0.85) | 61 (1.0) | 51.8 (0.85) | 61 (1.0) | 51.8 (0.85) | 61 (1.0) | 51.8 (0.85) |
| HDT at 264 p.s.i. ° C | 168 | 165 | 128 | 119 | 134 | 129 | 174 | 170 |

It will be noted from Table B above that the ERL 4205 epoxycyclopentyl ether material with a relatively low functionality of about 2.0 has an unexpectedly higher heat distortion temperature as compared, for example, with epoxy novolac resin DEN 438 with its higher functionality of about 3.6. It should also be noted that the epoxy novolac resins DEN 431 and DEN 438 have a too rapid cure to be useful in the present application.

Figure 2:
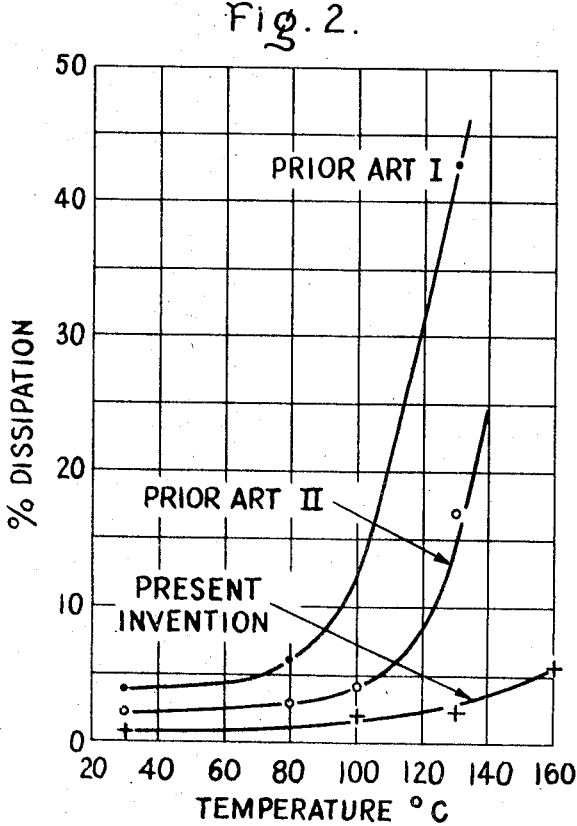

Those features of the invention which are believed to be novel are set forth with particularity in the claims appended hereto. The invention will be better understood, however, from a consideration of the following description and the drawing in which FIG. 1 shows a cross-sectional view of an electrical conductor bar insulated according to the present invention, and FIG. 2 shows a comparison of dissipation factors for insulation using prior art materials and those of the present invention.

The following examples will illustrate the practice of this invention, it being realized that they are not to be taken as limiting in any way.

Shown in Table I below is the effect of variations in the stoichiometric amounts of hardener used with the present resin system. The bis(2,3-epoxycyclopentyl) ethers used in the examples of Table I were 25 parts by weight each of the ERRA 0300 and ERLA 0400 epoxies along with 50 parts by weight of ERLA 0449 as the epoxy novolac. The resorcinol formaldehyde condensate or resin was penacolite B-1A also shown in parts by weight and opposite stoichiometry expressed as the ratio of hydroxyl to epoxide groups. Also shown in Table I are the dissipation factors of such resin combinations, their heat distortion temperature and Shore D hardness. All examples were cured for 15 hours at 170° C. In all cases herein the notation "HDT" signifies the heat distortion temperature.

TABLE II.—EFFECT OF HARDENER STOICHIOMETRY ON WEIGHT LOSS

| Examples | 3 | 4 | 5 | 6 | 7 |
|---|---|---|---|---|---|
| Stoichiometry | 0.7 | 0.8 | 0.84 | 0.9 | 1.0 |
| Bis(2,3-epoxycyclopentyl) ethers | 50 | 50 | 50 | 50 | 50 |
| Epoxy novolac | 50 | 50 | 50 | 50 | 50 |
| Resorcinol formaldehyde | 34.5 | 39.4 | 41.4 | 44.3 | 49.3 |
| Thermal aging, wt. change (percent): | | | | | |
| 160° C., N₂: | | | | | |
| 1 Week | −.02 | −.03 | −.02 | −.02 | −.04 |
| 1 Month | −.03 | −.03 | −.03 | −.03 | −.04 |
| 3 Months | −.04 | −.06 | −.10 | −.20 | −.07 |
| 6 Months | −.05 | −.099 | −.40 | −.81 | −1.08 |
| 160° C, Air: | | | | | |
| 1 Week | +.04 | +.02 | +.02 | +.01 | +.01 |
| 1 Month | +.06 | +.04 | +.04 | +.02 | +.02 |
| 3 Months | −.03 | −.06 | −.05 | −.11 | −.20 |
| 6 Months | −.21 | −.23 | −.23 | −.70 | −1.82 |
| 180° C, Air: | | | | | |
| 1 Week | −.07 | −.09 | −.39 | −1.76 | −2.50 |
| 1 Month | −.15 | −2.24 | −2.95 | −3.54 | −3.53 |
| 3 Months | −2.57 | −4.47 | −4.75 | −5.23 | −5.68 |
| 6 Months | −4.44 | −5.42 | −5.84 | −6.36 | −8.10 |

From Table I above, it will be seen that the optimum heat distortion temperature corresponds to a 1:1 ratio of hydroxyl to epoxy groups, this temperature being about 201° C. With less strenuous curing this heat distortion temperature would be somewhat lower and for more strenuous post cures somewhat higher. From a consideration of the dissipation factors, it will be seen that at 0.4 hydroxyl to epoxy groups the electrical properties are poor and fall off rapidly with increasing temperatures. At stoichiometric ratios of 0.85, 1.0 and 1.2, the dissipation factors are desirably low at room temperature and are less than 2 percent even at 175° C. From a consideration of the hardness data of Table I, it will be seen that at lower hardener stoichiometric ratios, the hardness falls off rapidly with increasing temperature whereas with the higher stoichiometric ratios the hardness is good even at elevated temperatures. From a consideration of the weight loss data in Table II, it will be seen that such weight losses are lower in the case of examples having a lower stoichiometric level of hardener. The weight gain in the 160° C. test at one day and one week indicates some slight oxida-

TABLE I.—EFFECTS OF HARDENER STOICHIOMETRY

| Example | 1 | 2 | 3 | 4 | 5 | 6 | 7 | 8 |
|---|---|---|---|---|---|---|---|---|
| Stoichiometry | 0.4 | 0.6 | 0.7 | 0.8 | 0.84 | 0.9 | 1.0 | 1.2 |
| Bis(2,3-epoxycyclopentyl) ethers | 50 | 50 | 50 | 50 | 50 | 50 | 50 | 50 |
| Epoxy novolac | 50 | 50 | 50 | 50 | 50 | 50 | 50 | 50 |
| Resorcinol formaldehyde | 19.7 | 29.6 | 34.5 | 39.4 | 41.4 | 44.3 | 49.3 | 59.1 |
| Dissipation factor (60 cycles, 10 v.p.m.): | | | | | | | | |
| 25 | .031 | .006 | .005 | .004 | .003 | .007 | .005 | .005 |
| 75 | .035 | .012 | .008 | .006 | .006 | .008 | .005 | .005 |
| 125 | .51 | .020 | .015 | .011 | .009 | .016 | .008 | .008 |
| 175 | | .25 | .061 | .024 | .016 | .021 | .011 | .011 |
| Heat distortion temp. (° C.): | | | | | | | | |
| 1 mils deflection | 27 | 74 | 100 | 132 | 140 | 168 | 171 | 175 |
| 5 mils deflection | 36 | 98 | 129 | 157 | 172 | 191 | 196 | 188 |
| 10 mils deflection (HDT) | 40 | 108 | 139 | 169 | 187 | 198 | 210 | 193 |
| Shore D hardness, temp. ° C.: | | | | | | | | |
| 25 | 83 | 92 | 92 | 92 | 92 | 93 | 93 | 99 |
| 75 | 71 | 78 | 81 | 87 | 88 | 88 | 89 | 86 |
| 100 | 32 | 75 | 75 | 85 | 87 | 87 | 87 | 82 |
| 125 | 20 | 71 | 75 | 85 | 85 | 85 | 85 | 88 |
| 150 | 30 | 65 | 70 | 82 | 84 | 85 | 85 | 85 |
| 175 | 20 | 50 | 65 | 77 | 80 | 80 | 80 | 85 |

Shown in Table II below is the effect of variations in hardener stoichiometry on the weight loss of the resin compositions of Examples 3, 4, 5, 6, and 7, such weight loss being measured as shown in nitrogen as well as in air.

tion of the resorcinol formaldehyde under aging in air.

From an over-all consideration of Tables I and II, it will be seen that a 1:1 hardener stoichiometry generally results in better physical and electrical properties at higher temperatures whereas a lower concentration of curing agent represented by 0.7 stoichiometry results in low weight loss on thermal aging as a result of gas generation within a micaceous insulation on thermal aging.

It has been found that the formulation may be modified with other epoxy compositions as stated above without adverse effect to modify viscosity, speed of cure, tack and handling properties. The effect of such other epoxy diluents is shown in Table IV below, all samples being cured for 15 hours at 170° C. with the resorcinol formaldehyde being Penacolite B–1A in a stoichiometric ratio of 0.85 hydroxyl equivalent per epoxy equivalent.

TABLE IV.—EFFECT OF EPOXY DILUENTS: DISSIPATION FACTOR AND HEAT DISTORTION TEMPERATURE

| Examples | 19 | 20 | 21 | 22 | 23 | 24 | 35 | 26 | 27 | 28 | 29 | 30 |
|---|---|---|---|---|---|---|---|---|---|---|---|---|
| ERRA 0300-ERLA 0400 (1:1) | 50 | 75 | 50 | 75 | 50 | 75 | 50 | 75 | 50 | 75 | 50 | 75 |
| CY-175 | 50 | 25 | | | | | | | | | | |
| ERLA 4221 | | | 50 | 25 | | | | | | | | |
| DEN-438 | | | | | 50 | 25 | | | | | | |
| UNOX 201 | | | | | | | 50 | 25 | | | | |
| UNOX 206 | | | | | | | | | 50 | 25 | | |
| ERX 41 | | | | | | | | | | | 50 | 25 |
| Resorcinol formaldehyde | 43.3 | 49.4 | 47.0 | 50.6 | 42.1 | 48.2 | 44.5 | 50.0 | 61.6 | 57.9 | 39.6 | 47.0 |
| Dissipation factor (60 cycles, 10 v.p.m.), temperature, ° C.: | | | | | | | | | | | | |
| 25 | .005 | .005 | .005 | .005 | .004 | .004 | .005 | .004 | .005 | .004 | .005 | .005 |
| 75 | .005 | .006 | .005 | .005 | .005 | .005 | .005 | .005 | .005 | .005 | .006 | .005 |
| 125 | .005 | .006 | .006 | .005 | .005 | .006 | .007 | .007 | .007 | .007 | .008 | .007 |
| 150 | .008 | .007 | .009 | .006 | .007 | .007 | .009 | .010 | .012 | .009 | .009 | .009 |
| 175 | .009 | .009 | .010 | .007 | .010 | .009 | .011 | .012 | .021 | .106 | .010 | .011 |
| Heat distortion temperature (264 p.s.i.), temperature, ° C.: | | | | | | | | | | | | |
| 1 mils deflection | 192 | 185 | 187 | 175 | 179 | 170 | 177 | 164 | 144 | 144 | 139 | 155 |
| 5 mils deflection | >200 | 195 | 194 | 185 | 186 | 184 | 186 | 183 | 159 | 166 | 148 | 168 |
| 10 mils deflection (HDT) | >200 | >200 | 197 | 193 | 190 | 190 | 189 | 187 | 166 | 174 | 153 | 175 |

The 0.84 stoichiometry represents the best over-all balance of the resin systems for tape impregnants.

Shown in Table III is the effect of variations in the weight proportions of the various bis(2,3-epoxycyclopentyl) ethers and epoxy novolac resins used, the cyclopentyl ethers in each case being ERRA 0300 and ERLA 0400 and the epoxy novolac, ERLA 0449 as shown. The resorcinol formaldehyde resin was Penacolite B–1A or Catalin resin CR–784 used in a stoichiometric ratio of 0.84 hydroxyl to epoxy groups, all samples being cured for fifteen hours at 170° C.

From Table IV above it will be seen that the dissipation factors from about 25 to 175° C. were about the same for all formulations, this factor being apparently insensitive to the type and amount of epoxy resin used to dilute the basic bis(2,3-epoxycyclopentyl) ether component.

The present materials were compared with a liquid bis-phenol-A diglycidyl ether epoxy resin cured with a phenol formaldehyde resin (resin R4), an epoxy novolac cured with a phenol formaldehyde resin (resin R5), and the cycloaliphatic epoxy resin ERLA 4221 cured with a phenol

TABLE III.—DISSIPATION FACTOR AND HDT

| Examples | 8 | 9 | 10 | 11 | 12 | 13 | 14 | 15 | 16 | 17 | 18 |
|---|---|---|---|---|---|---|---|---|---|---|---|
| Designation | A | B | C | D | E | F | G | H | I | J | K |
| ERRA-0300 | 50 | 40 | 30 | 25 | 20 | 10 | | | 100 | | 50 |
| ERLA-0400 | 50 | 40 | 30 | 25 | 20 | 10 | | 100 | | 50 | |
| ERLA-0449 | | 20 | 40 | 50 | 60 | 80 | 100 | | | 50 | 50 |
| Penacolite B-1A | 53.7 | 48.8 | 43.7 | | 38.6 | 33.4 | 28.3 | 53.7 | 53.7 | 41.4 | 41.4 |
| C.R.-784 | | | | 41.4 | | | | | | | |
| Dissipation factor (60 cycles, 10 v.p.m.): | | | | | | | | | | | |
| 25 | .005 | .005 | .005 | .004 | .004 | .0036 | .005 | .005 | .004 | .005 | .005 |
| 75 | .005 | .005 | .005 | .005 | .005 | .004 | .006 | .006 | .005 | .005 | .005 |
| 125 | .006 | .006 | .007 | .009 | .007 | .007 | .007 | .0084 | .006 | .008 | .006 |
| 175 | .009 | .008 | .010 | .010 | .0096 | .014 | .016 | .0092 | .0098 | .025 | .010 |
| Heat distortion temp. (°C.): | | | | | | | | | | | |
| 1 mils deflection | 160 | 150 | 145 | 140 | 152 | 140 | 131 | 176 | 159 | 158 | 163 |
| 5 mils deflection | 179 | 172 | 170 | 154 | 160 | 154 | 145 | 185 | 180 | 175 | 184 |
| 10 mils deflection (HDT) | 184 | 177 | 177 | 161 | 169 | 162 | 153 | 189 | 184 | 812 | 190 |

From the data in Table III it will be seen that a composition consisting entirely of bis(2,3-epoxycyclopentyl) ethers and no epoxy novolac has a somewhat higher heat distortion temperature of 184° C. than does a resin consisting entirely of epoxy novolac with a heat distortion temperature of 153° C. Materials consisting entirely of the cyclopentyl ether component are viscous liquids at room temperature whereas a 50–50 blend of the cyclopentyl ether and epoxy novolac is a soft solid and a formulation consisting entirely of epoxy novolac is a hard, brittle solid. It has been found that compositions containing from about 30 to 70 weight percent of bis(2,3-epoxycyclopentyl) ethers and from 70 to 30 percent epoxy novolac provide materials having the best handleability when used in preparing micaceous insulation. From the data on dissipation factor, it will be seen that electrical properties are not appreciably affected as the epoxy portion of the resin is varied.

formaldehyde resin (resin R9A). Such materials when cured for 15 hours at 160° C. had heat distortion temperatures as shown in Table V below. The resin indicated as "Ex. 5 Present Resin" was one containing about 25 parts of ERRA 0300, about 25 parts of ERLA 0400, 50 parts of ERLA 0449 and 41.4 parts of Penacolite B–1A which, it will be seen, is the same as that of Example 5 above.

TABLE V.—HEAT DISTORTION TEMPERATURE

Resin [1]:                          Heat distortion temp., ° C.
    R4 (BPA-diglycidyl ether) _____ 62
    R5 (phenol formaldehyde) _____ 108
    R9A (cycloaliphatic, epoxy ERLA 4221) ____ 140
    Ex. 5 present resin _____ 162

[1] Cured 15 hours at 160° C.

Shown in Table VI below is a comparison of various mechanical properties as shown v. temperature for these various materials.

TABLE VI.—MECHANICAL PROPERTIES v. TEMPERATURE
[Flexural strength v. temperature (results in p.s.i.)]

| | 25° C. | 50° C. | 100° C. | 125° C. | 150° C. |
|---|---|---|---|---|---|
| Resin: | | | | | |
| R4 | 17,011 | 9,068 | Rubbery | | |
| R5 | 23,304 | 18,635 | 16,589 | 5,185 | 894 |
| R9A | 11,444 | 11,188 | 9,227 | 2,996 | 1,197 |
| Ex. 5 | 16,325 | 15,442 | 13,014 | 8,540 | 7,127 |
| Compressive strength v. temperature (results in p.s.i.) | | | | | |
| R4 | 22,520 | 14,653 | 12,200 | (1) | (1) |
| R5 | 21,193 | 17,000 | 10,760 | 6,110 | (1) |
| R9A | 24,870 | | 16,470 | 13,300 | 7,700 |
| Ex. 5 | 26,100 | | 17,100 | 13,800 | 9,900 |
| Tensile strength v. temperature (results in p.s.i.) | | | | | |
| R9A | 8,031 | 7,572 | 6,624 | 3,576 | 667 |
| Ex. 5 | 9,459 | 9,367 | 6,750 | 5,366 | 3,724 |

[1] Creeps.

Shown in Table VII is a comparison of the dissipation factor at varying temperatures for these same materials.

TABLE VII.—DISSIPATION FACTOR (60 CYCLES) v. TEMPERATURE

| | 25° C. | 100° C. | 130° C. | 155° C. | 175° C. |
|---|---|---|---|---|---|
| Resin: | | | | | |
| R4 | 0.001 | 0.047 | 0.019 | 0.025 | |
| R5 | 0.006 | 0.014 | 0.013 | 0.034 | |
| R9A | 0.001 | | | | 0.021 |
| Ex. 5 | 0.005 | 0.005 | 0.009 | 0.013 | 0.021 |

From a consideration of Tables V through VII above, it will be seen that the present materials represented by Example 5 have higher heat distortion temperatures and better retention of mechanical properties at elevated temperatures than the other materials shown.

When reconstituted micaceous material or mica paper, which can have a fabric backing such as of glass, or polyethylene terephthalate, or other well known reinforcement, is impregnated with the resinous compositions of the present invention, there are provided insulating tapes or sheets which are characterized by a good hand or drape which permits them to be readily wound by hand or by machine as ground or other insulation on electrical components such as the conductor bar shown in FIG. 1 of the drawing. In FIG. 1 there is shown a typical conductor bar 1 having a plurality of conductor turns 2 which are insulated from each other by turn insulation 3 in the usual manner, the arrays of conductors being separated by strand separators 4. Wrapped around the armature winding bar as ground insulation 5 are a plurality of layers of mica paper tape 6 coated and impregnated or treated with the resin of the present invention. In preparing such an insulated conductor bar, the entire assembly is covered with a sacrifice tape and placed in a pressure tank and evacuated. It is to be particularly noted that there is no need in this process to remove solvents from the present resins, the only purpose of the evacuation being to remove any entrapped air. After vacuum treatment, molten bitumen or other heat transmitting fluid is introduced into the tank under pressure to cure the resin in well known manner. Upon completion of curing, the bar or winding is removed from the bath, cooled and sacrifice tape removed. In testing actual micaceous insulation employing the present resinous materials, there were laid up from 10 to 45 layers of reconstituted mica paper, 4 mils thick, each layer having two glass fabric supporting backers 1.7 inches thick, to provide a total unimpregnated laminate thickness of 60 to 300 mils. This set of laminates was impregnated with the resin of Example 5 and cured for 16 hours at a temperature of 170° C. Likewise, another set of such laminates was similarly treated with the resin of U.S. Pat. 2,707,204 mentioned above. When the respective laminates were tested to determine interlaminar shear strength, flexural strength and dissipation factor at various temperatures, the results were as shown in Table VIII below.

TABLE VIII

| Laminate properties | Example 5 | Prior art |
|---|---|---|
| Interlaminar shear strength (p.s.i.): | | |
| 25° C | 877 | 600 |
| 135° C | 844 | 110 |
| Flexural strength (thousands, p.s.i.): | | |
| 25° C | 35.4 | 31.5 |
| 130° C | 32.4 | 3.2 |
| 150° C | 31.2 | 2.9 |

Shown in FIG. 2 is the percent dissipation factor v. temperature for micaceous tape ground insulation on conductor bars made as above as compared with prior art materials. The tape of the curve marked "Prior Art I" was made up of asphalt or bitumen impregnated mica flake tape. "Prior Art Tape II" was made up of mica paper tape similar in all ways to the present tape except for the impregnant which was a resin of U.S. Pat. 2,707,204. The curve marked "Present Invention" relates to materials of the present invention, more specifically the material of Example 5. From FIG. 2 it will immediately become apparent that the percent dissipation factor of the present materials are far and away superior or lower than those of the prior art materials, particularly at the more elevated temperatures at which high capacity modern equipment operates.

It will be realized, of course, that tapes made of other impregnable materials with or without backers can be advantageously treated with the present resins. Likewise, such other materials can be used in conjunction with micaceous materials.

There are provided by the present invention peculiar resinous compositions and electrical insulation treated therewith and insulated assemblies, the uncured material being characterized by long shelf life. By reason of their solventless nature, such insulation when applied to electrical components and cured provide singularly void-free insulated assemblies which are characterized by superior mechanical characteristics at elevated temperatures as well as salutary electrical properties.

What we claim as new and desire to secure by Letters Patent of the United States is:

1. A solventless resinous composition consisting essentially of by weight (a) from about 30% to 70% of relatively slower curing bis(2,3-epoxycyclopentyl) ether and from about 70% to 30% of other relatively faster curing 1,2 epoxy resin, and (b) non-basic resorcinol formaldehyde in an amount to provide about 0.6 to 1.2 hydroxyl groups per epoxy group of (a).

2. A resinous composition as in claim 1 wherein said resorcinol formaldehyde is present in an amount to provide about 0.8 hydroxyl group per epoxy group.

3. A resinous composition as in claim 1 wherein said resorcinal formaldehyde is present in an amount to provide about 0.84 hydroxyl group per epoxy group.

4. A resinous composition as in claim 1 wherein said resorcinol formaldehyde is present in an amount to provide about 1.0 hydroxyl group per epoxy group.

5. Electrical insulating material treated with the resinous composition of claim 1.

6. Electrical insulating material comprising micaceous material treated with the resin of claim 1.

7. Electrically insulating sheet material comprising mica paper treated with the resinous composition of claim 1.

8. Electrical insulating tape comprising mica paper having a reinforcing backer, said tape being treated with the resinous composition of claim 1.

9. An electrical assembly insulated with an electrical insulating material treated with the resinous composition of claim 1.

10. The process of insulating an electrical assembly which comprises applying to said assembly an electrical insulating material treated with a resinous composition consisting essentially of by weight (a) from about 30% to 70% of relatively slower curing bis(2,3-epoxycyclopentyl) ether and about 70% to 30% of other relatively faster curing 1,2 epoxy resin, and (b) resorcinol formaldehyde in an amount to provide about 0.6 to 1.2 hydroxyl groups per epoxy group of (a).

References Cited

UNITED STATES PATENTS

| | | | |
|---|---|---|---|
| 2,918,439 | 12/1959 | Phillips | 260—831 |
| 2,935,488 | 5/1960 | Phillips | 260—830 |
| 2,917,570 | 12/1959 | Wolff | 174—120 |
| 3,254,150 | 5/1966 | Rogers | 161—171 |
| 3,297,635 | 1/1967 | Bergman | 161—171 |

FOREIGN PATENTS

| | | | |
|---|---|---|---|
| 86,345 | 11/1956 | Netherlands | 260—831 |
| 88,517 | 5/1958 | Netherlands | 260—831 |
| 89,335 | 9/1958 | Netherlands | 260—831 |

PAUL LIEBERMAN, Primary Examiner

U.S. Cl. X.R.

117—123; 156—330; 161—185; 260—2, 47, 830, 831

UNITED STATES PATENT OFFICE
CERTIFICATE OF CORRECTION (Page 1)

Patent No. 3,563,850                Dated February 16, 1971

Inventor(s) Donald F. Stackhouse and Mark Markovitz

It is certified that error appears in the above-identified patent and that said Letters Patent are hereby corrected as shown below:

In the specification:

Column 4, line 12, "components" should be -- component -- ;

line 71, "Show" should be -- Shown -- .

Column 5, Table B, opposite B1A, last column, "51.88" shoul be -- 51.8 -- ;

Table I, opposite "10 mils deflection (HDT)", und Example 7, "210" should be -- 201 -- ;

Table I, opposite "Shore D hardness, temp.° C., 2 under Example 8, "99" should be -- 92 --

Table I, opposite "Shore D hardness, temp.° C., 7 under Example 8, "86" should be -- 89 --

Column 6, Table II, opposite "Thermal aging, wt. change (percent), 6 months", Example 4, ".099" should be -- .09 -- ;

line 40, "0.85" should be -- 0.84 -- .

Column 7, Table III, opposite "175", Example 17, ".025" sho be -- .015 -- ;

Table III, opposite "10 mils deflection (HDT)", Example 17, "812" should be -- 182 -- .

UNITED STATES PATENT OFFICE
CERTIFICATE OF CORRECTION (Page 2 o

Patent No. 3,563,850   Dated February 16, 1971

Inventor(s) Donald F. Stackhouse and Mark Markovitz

It is certified that error appears in the above-identified patent and that said Letters Patent are hereby corrected as shown below:

Column 8, Table IV, Example "35" should be -- 25 -- ;

Table IV, "temperature °C.", first use in the middle of the Table, should be directly above the number 25, and "Dissipation factor (60 cycles, 10 v.p.m.)" should be to the right of "temperature °C." ;

Table IV, opposite "150", Example 23, ".005" shoul be -- .006 -- ;

Table IV, opposite "175", Example 28, ".106" shoul be -- .016 -- .

Column 9, Table VI, "Flexural strength v. temperature (resul in p.s.i.)" is in the wrong place; shoul appear in line 7 after the line showing °'s C.

Signed and sealed this 3rd day of August 1971.

(SEAL)
Attest:

EDWARD M. FLETCHER, JR.
Attesting Officer

WILLIAM E. SCHUYLER, JR.
Commissioner of Patents